United States Patent
Routhenstein

(10) Patent No.: US 7,503,485 B1
(45) Date of Patent: *Mar. 17, 2009

(54) METHOD FOR GENERATING CUSTOMER SECURE CARD NUMBERS

(75) Inventor: Larry Routhenstein, Orlando, FL (US)

(73) Assignee: Privasys, Inc., Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,113

(22) Filed: Mar. 22, 2007

Related U.S. Application Data

(63) Continuation of application No. 09/960,715, filed on Sep. 21, 2001, now Pat. No. 7,195,154.

(51) Int. Cl.
*G06K 5/00* (2006.01)
*G06F 17/00* (2006.01)

(52) U.S. Cl. ........................ 235/380; 235/375

(58) Field of Classification Search ............... 235/375, 235/379–382; 705/16–18, 35, 39, 41, 44
See application file for complete search history.

(56) References Cited

U.S. PATENT DOCUMENTS

| | | | | |
|---|---|---|---|---|
| 6,805,288 B2 * | 10/2004 | Routhenstein et al. | ...... | 235/380 |
| 6,901,387 B2 * | 5/2005 | Wells et al. | ................... | 705/64 |
| 7,177,848 B2 * | 2/2007 | Hogan et al. | .................. | 705/67 |
| 7,195,154 B2 * | 3/2007 | Routhenstein | .............. | 235/380 |
| 2001/0047335 A1 * | 11/2001 | Arndt et al. | ................... | 705/44 |

* cited by examiner

*Primary Examiner*—Thien M. Le
*Assistant Examiner*—April A Taylor
(74) *Attorney, Agent, or Firm*—TIPS Group

(57) ABSTRACT

A method for providing secure transactions generates a Secure Card Number ("SCN") for a first entity that is transferred with a first entity identifier to a second entity and then to a money source that verifies that the transaction is valid by use of the first entity identifier and the SCN. The SCN includes a Transaction Information Block ("TIB"), a Counter Block, and an encrypted Personal Identification Number ("PIN") Block. The SCN is transferred to the money source in an account number or a non-account data field. The money source can use the TIB to determine whether the SCN should be used once or multiple times or to identify one of several physical devices, all of which are issued to the first entity used to generate the SCN. The money source validates the SCN by duplicating the encryption process used to create an encrypted PIN Block and comparing the result to the encrypted PIN Block received with the transaction. A Triple Data Encryption Standard algorithm encrypts a PIN Block generated from a PIN, a Sequence Insertion Number ("SIN") and a known starting value. The SIN can be a combination of three seed values and a random value generated by a Pseudo Random Number Generator ("PRNG") initialized with the seed values. A Counter value is associated with the Counter Block and the seed values.

2 Claims, 1 Drawing Sheet

METHOD FOR GENERATING CUSTOMER SECURE CARD NUMBERS

CROSS REFERENCE TO RELATED APPLICATIONS

This continuation application claims priority to U.S. patent application Ser. No. 09/960,715, filed on Sep. 21, 2001 now U.S. Pat. No. 7,195,154, and is incorporated herein in its entirety by reference.

The present application is related to U.S. application Ser. Nos. 09/667,081 and 09/667,089, filed Sep. 21, 2000, which are continuation-in-part applications of U.S. Ser. No. 09/659,434, filed Sep. 8, 2000, which is a continuation-in-part of U.S. Ser. No. 09/640,044, filed Aug. 15, 2000, which is a continuation-in-part of U.S. Ser. No. 09/619,859, filed Jul. 20, 2000, which is a continuation-in-part of U.S. Ser. No. 09/571,707, all of which disclosures are specifically incorporated herein by reference. This application is also related to another application being filed concurrently herewith, entitled Method for Generating Customer Secure Card Numbers Subject To Use Restrictions By An Electronic Card, Ser. No. 09/960,714.

FIELD OF THE INVENTION

The present invention is in the field of payment systems.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made prior to its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come tip with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number (PIN) as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

After the issuance of U.S. Pat. No. 5,956,699, Wong et al. also invented an anonymous electronic card for generating personal coupons useful in commercial and security transactions, a method for implementing anonymous credit card transactions using a fictitious account name, as well as methods for generating one-time unique numbers that can be used in credit card transactions in the brick and mortar world, e-commerce, m-commerce and in many other applications.

The present invention seeks to provide new methods for generating and processing Secure Card Numbers (SCN) that can be used in all types of transactions in which a conventional credit card account number is accepted. In addition, the present invention conforms to the existing standards for PIN encryption as promulgated by the American Bankers Association (ABA), the American National Standards Institute (ANSI), the International Standards Organization (ISO), and the Federal Information Processing Standards (FIPS) Publications of the National Institute of Standards and Technology (NIST). Because the methodology is well suited for use in hardware and software applications, it has widespread applicability to many different types of transactions.

The present invention is related to the concept of customer one-time unique purchase order numbers ("Coupons") as described in U.S. Ser. No. 09/640,044. An algorithm is executed that uses a user account number, a customer sequence number, a customer permutated user key, and a Transaction Information Block (TIB) as input variables to form an SCN that is correlated with a sequence number. Combining a user key with a user account number, a user insertion key correlated with the customer sequence number, and then encrypting the result using the Triple Data Encryption Standards (TDES), forms the customer permutated user key. A random number generator generates the user insertion key that is correlated with the sequence number. The TIB may provide several pieces of information, including the conditions under which the SCN will be valid (i.e., the SCN type), additional account identification information, and the status of the device used for SCN generation. The sequence number can be changed after each SCN is generated and a new SCN can then be generated using a new user insertion variable correlated to the changed sequence number.

After an SCN is generated, it is transferred with a first entity identifier to a second entity (which can actually be several entities), which then transfers the information to a money source. An individual SCN is verified as being valid by the money source by duplicating the generation of the customer permutated user key for the specified first entity and the specified sequence number, and then comparing it to the customer permutated user key which is embedded in the provided SCN. Additionally, the money source verifies that the specified SCN type is valid given the specific conditions of the transaction. Once verified as valid, each SCN passes through a life cycle in accordance with conventional credit card processing practices and with its SCN type, in which it may be used for various types of transactions before being retired. If a preselected number of SCNs are received by the money source and determined to be invalid (either consecutively or within a predetermined timeframe), then an invalid user account number condition is set to prevent further attempts to verify SCNs for that first entity.

A user key can be entered into an input device, and validates the user key by comparing it to a stored user key. If the entered user key is valid, the user can generate an SCN. The sequence number changes each time a user key is entered into the input device.

SUMMARY OF THE INVENTION

The present invention is generally directed to a method for providing one or more secure transactions between a first entity and at least one additional entity in which a Secure Card Number ("SCN") is generated for the first entity, then transferred with a first entity identifier to a second entity and then transferred to a money source that verifies that the transaction is valid by use of the first entity identifier and the SCN. The SCN includes a Transaction Information Block ("TIB"), a Counter Block, and an encrypted Personal Identification Number ("PIN") Block. The SCN can be transferred to the money source in an account number while the first entity identifier is transferred to the money source in a non-account data field or the first entity identifier can be transferred to the money source as an account number while the SCN is transferred to the money source in a non-account data field.

In a first, separate aspect of the present invention, the TIB can be used for invoking one or more restrictions on use of the SCN. The money source can use the TIB to determine whether the SCN should be a single-use SCN (i.e., can only be used for a single transaction by the first entity) or a multiple-use SCN (i.e., can be used for multiple transactions between the first entity and a single merchant). The TIB can also be used by the money source to identify the physical device used to generate the SCN.

In another, separate aspect of the present invention, the money source validates the SCN by duplicating a PIN Block encryption process used to create the encrypted PIN and by then comparing the result to the encrypted PIN Block received with the transaction.

In still another, separate aspect of the present invention, the encrypted PIN Block is formed by using a Triple Data Encryption Standard algorithm ("TDES") to encrypt a PIN Block. The PIN Block can be generated from a PIN associated with the first entity, a Sequence Insertion Number ("SIN") and a starting value known to both the first entity and to the money source. The SIN can be a combination of a first set of seed values and a random value generated by a Pseudo Random Number Generator ("PRNG") that was initialized with the first set of seed values. The first set of seed values is associated with a Counter value that is associated with Counter Block.

In yet another, separate aspect of the present invention, when the SCN is a nine digit number, the TIB is a one digit number, the Counter Block is a four digit number, and the encrypted PIN Block is a four digit number. The encrypted PIN Block can be created by dividing an 8-byte Sequence Insertion Number ("SIN") into four 2-byte integers (three seed values and the random number), adding the PIN and a pre-assigned constant 4-digit value to each of the four 2-byte integers, concatenating the results to form an 8-byte input block which the TDES encrypts into an 8-byte output block, dividing the 8-byte output block into four 2-byte integers x1, x2, x3 and x4 and then using integers x1-x4 to produce the 4-digit encrypted PIN Block with a value P, wherein P=(Ax1+Bx2+Cx3+Dx4) mod 10000, each of the values A, B, C and D being pre-assigned odd integers.

Accordingly, it is a primary object of the present invention to provide a method for generating and processing customer Secure Card Numbers for use in transactions where conventional credit card numbers are accepted.

This and further objects and advantages will be apparent to those skilled in the art in connection with the detailed description of the preferred embodiment set forth below.

DETAILED DESCRIPTION OF THE PREFERRED EMBODIMENTS

Figure 1:
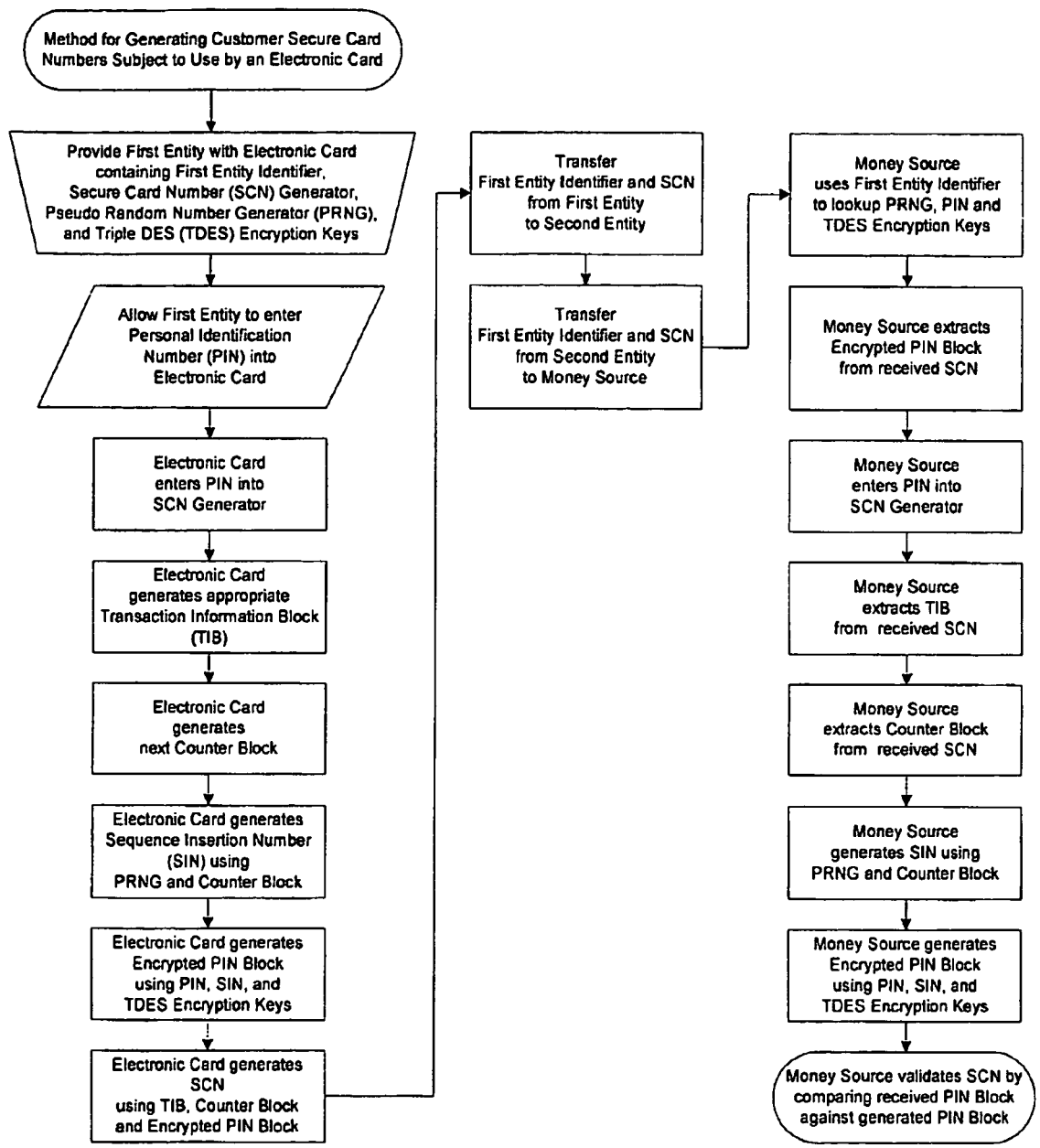
FIG. 1 is a flow diagram of an embodiment, set forth by way of example and not limitation.

The present invention is related to U.S. Pat. Nos. 5,913,203, 5,937,394 and 5,956,699, the disclosures of which are all specifically incorporated herein by reference.

The preferred embodiment of the present invention is adapted for use in credit card transactions, and as such can be used in connection with a wide variety of instruments that can be used in connection with such financial transactions: electronic cards, software programs used in network applications, telephones (especially telephones used in what is now being referred to as m-commerce, or mobile commerce), or even physical imprint transactions. Moreover, it can be used whether such transactions are conducted in person, face-to-face, or whether such transactions are conducted by an indirect medium, such as a mail order transaction, a transaction conducted over a computer network (for example, the Internet), or a telephone transaction.

As is the case in most financial transactions, three parties are typically involved in completed credit card transactions according to the present invention. A party presents a credit card account number with the intent to initiate a monetary payment (or credit/return). In the context of the following description, this is the first entity or customer. Another party receives the credit card account number with the intent to receive a monetary payment (or credit I return), and this party can be a single party or two or more parties. In the context of the following description, the party or parties that are receiving the credit card account number are referred to as the second entity or merchant. Finally, there is at least one party, and usually multiple parties, that serve as intermediaries to the monetary payment (or credit/return). The second entity provides the credit card account number to this party over several transactions to effect the monetary payment (or credit/return): authorization, incremental authorization, authorization reversal, settlement, and credit/return. The intermediary group of one or more parties will be referred to in the context of the following description as a money source. Thus, the money source may be one or more banks, a credit card company or any other institution involved with issuance of credit cards or bank debit cards, such as a credit union or other institution, or a money source as described in U.S. Pat. No. 5,913,203.

In connection with the preferred embodiment, it is not necessary that the first entity use a real identity, although such an option is also acceptable. Instead, a pseudonym, such as a screen name or an alias, could be used to protect the first entity's privacy and provide additional security.

Although the first entity need not use a real identity, the first entity must establish an account with a money source. When the account is established, the first entity and the money source must agree upon a payment mechanism or protocol. In the case of a credit card or a bank card, this could be done in the same fashion as exists today, and the first entity could select a fictitious account name as is explained in greater detail in co-pending U.S. patent application Ser. No. 09/619,859. It is especially preferred that two different users not be allowed to select the same fictitious account name so that a fictitious account name also represents a unique identifier. However, the preferred embodiment could also be used in connection with a prepaid account. In such a scenario, the first entity could simply purchase a prepaid card and no real identity would ever be required.

When the first entity establishes an account with the money source, a user key must be selected. The user key can be a PIN, similar to that which is currently in widespread use in the United States in connection with automated teller machines. Both the first entity and the money source must have access to the user key, which can be selected by either entity. In order to be able to retrieve this user key, the money source must create a record associated with the first entity that includes the user key and a first entity identifier (whether this be the real name of the first entity or a fictitious account name).

Once the first entity has established an account with the money source and a user key has been selected, the first entity must be supplied with the means to generate a customer SCN. As already described, this could be hardware or software, but in either case it will include a user account number, a customer random number generator that will be used to generate user insertion keys that are correlated with a customer sequence number, and TDES encryption keys.

The TDES encryption standard is the accepted standard for protecting a PIN during data transmission of financial transactions, as described by ISO 9564-1-1991 (Banking—Personal Identification Number Management and Security—PIN Protection Principle, and Techniques, Section 6.2), ISO 9564-2-1991 (Banking—Personal Identification Number Management and Security—Approved Algorithms for PIN Encipherment), ANSI X9.52-1998 (Triple Data Encryption Algorithm—Modes of Operation), and FIPS PUB 46-3 (Data Encryption Standard (DES), dated 1999), the disclosures of which are specifically incorporated herein by reference.

In order to effectively use TDES for PIN encryption, the PIN must be combined with a new set of randomly generated data for each transaction. Otherwise, the encrypted PIN would always be the same value. A customer random number generator, such as the one that is described in U.S. patent application Ser. No. 09/640,044, filed Aug. 15, 2000 and which is generally known as a Linear Congruential Generator (LCG), is used for this purpose. This random number generator is algorithmic (i.e., pseudo-random)—when starting with the same set of seeds, it always produces the same sequence of numbers. It can therefore be reproduced by the money source in order to validate a given SCN. Furthermore, since this pseudo random number generator generates its values in a reproducible sequence, each of the values in the sequence can be identified by a Counter value that indicates that number's location in the sequence. The set of random numbers generated and combined with the PIN are collectively referred to as the Sequence Insertion Number (SIN).

In the real world of credit card transactions, it is not possible to assume that transactions conducted by the first entity in a given order will always be received by the money source in that same order. Therefore, the money source method of SCN validation must be based on an embedded sequence value. The Counter value is used for this purpose in the preferred embodiment.

In general, this method can be used to generate SCNs of many different lengths. In the conventional credit card processing infrastructure, a credit card number is typically 16 digits in length. Such a number comprises three sub-numbers: a 6 digit Bank Identification Number (BIN), a 9-digit account number, and a 1-digit checksum number. For the purpose of being compatible with the existing credit card processing infrastructure, the SCN could be 9 digits in length, and could take the place of the account number in the conventional 16-digit credit card number.

In the preferred embodiment, the 9-digit SCN itself comprises three sub-numbers: a 1 digit TIB, a 4 digit Counter Block (which identifies the random number being used for encryption), and a 4 digit encrypted PIN Block.

The 1 digit TIB may take on up to 10 different values, each of which may indicate multiple pieces of information. The TIB can be used to determine which of a plurality of account numbers associated with the first entity should be used for the first transaction. The account numbers can represent, for example, different credit card accounts or different payment or credit cards. A first account number might be associated with the TIB value of 0, a second account number might be associated with the values of 1 and 2, a third account number might be associated with values of 3 and 4, and so forth, wherein any odd value may be restricted to a one transaction limitation while any even value may be used to invoke permission for multiple transactions at a single merchant. In the preferred embodiment, a TIB value of 0 indicates that the SCN may only be used for one transaction; any attempts to use it for subsequent transactions will result in a transaction denial from the money source. A value of 1 indicates the same transaction restrictions as 0, but also indicates that the device generating the SCN has a low battery power condition. A value of 2 indicates that the SCN may be used for multiple transactions, but only at a single merchant; any attempts to use it for subsequent transactions at a different merchant will result in a transaction denial from the money source. A value of 3 indicates the same transaction restrictions as 1, but also indicates that the device generating the SCN has a low battery power condition. Furthermore, a set of TIB values (4, 5, 6, 7) might represent the same restriction and status information as (0, 1, 2, 3), respectively, but further indicate that the transaction is associated with a different subentity (e.g., the first entity identifier identifies a married couple, and the TIB identifies each individual spouse.) Other values might also be used to enforce additional transaction restrictions in ways readily apparent to those skilled in the art.

The TIB can also be used by the money source to uniquely identify a physical device (such as an electronic card) used to generate the SCN. This aspect of the TIB is especially useful when the money source issues more than one card to a first entity. Multiple cards might be issued to the same person (i.e., the first entity) for different uses, or multiple cards might be issued to the same person for use by different individuals (such as family members). In such instances, the TIB can identify which physical card, issued to the first entity, is used for a given transaction. When the TIB is used in this way, the TIB can be used as a customization variable to recognize multiple cards otherwise issued to a single first entity (which might also be a legal entity, such as a corporation).

The 4-digit Counter Block is unencrypted information provided so that the money source may decrypt and validate the SCN. It may be simply the actual Counter value (incremented after each use), but in the preferred embodiment, it is created by adding the Counter value to a starting value known to both the first entity and to the money source.

The 4-digit PIN Block is the encrypted information that is used to validate the fact that the SCN originated from the first entity. The PIN Block is formed using the PIN, the SIN, and a starting value known to both the first entity and to the money source. It is encrypted using TDES, which requires use of three 64-bit keys known to both the first entity and to the money source. In order to encrypt such a small number (16 bits) with such a high level of encryption (158 bits), the PIN must first be expanded to a 64 bit number, then encrypted, and finally reduced back to a 16 bit number—and in such a way that it is guaranteed to be different for each transaction.

The SIN is the product of an LCG random number generator that is initialized with three 2-byte integer seeds—the result of operating the LCG on these seeds is a 2-byte random value. The 8-byte SIN consists of the three seeds plus the random value. As a by-product of its operation, the LCG also produces three new seeds, which will be used for the next iteration of the LCG algorithm. The SIN may therefore be associated with a Counter value that indicates a unique location in the sequence of seeds and value generated by the LCG. This SIN is used as the random basis for each successively TDES-encrypted PIN Block, and guarantees a properly encrypted PIN Block for each transaction. To allow proper validation of the SCN, the Counter value stored in the Counter block is the one associated with the SIN used as the random basis for the PIN Block.

The creation of the PIN Block starts by dividing the 8-byte SIN into four 2-byte integers. The PIN and a predefined constant value are both added to each individual 2-byte integer. The results are then concatenated back again to form an 8-byte input block to the TDES algorithm, which encrypts them into an 8-byte output block. The output block is then divided back into four 2-byte integers (x1, x2, x3, x4). These four values are then used in the following formula to produce the 4-digit PIN Block value P:

Formula 1: PRNG Value Calculation $$P = (Ax_1^+ Bx_2^+ Cx_3^+ Dx_4) \bmod 10000$$

In this formula, the four values (A,B,C,D) are each odd integers. The "mod" calculation is a standard modulo arithmetic operation, and works as follows: if the resulting number is greater than 10,000 (or 20,000 or 30,000, etc.), then the value of 10,000 (or 20,000 or 30,000, etc.) is subtracted from it, leaving a positive four digit value.

Once created, the SCN is transmitted along with the first entity identifier from the first entity to the second entity and, subsequently, to the money source. In one embodiment, the SCN is used in an account number that replaces the conventional credit card number, and the first entity identifier is a static 9 digit number pre-assigned to the first entity that is transferred to the money source in a non-account data field. In the case of an electronic swipe credit card transaction, the first entity identifier is dynamically encoded onto Track 1 and/or Track 2 of the magnetic stripe in the area known as the Discretionary Data Field, which comprises up to 13 digits of information. In the case of a transaction where the first entity is not present, such as a mail order, telephone order, or Internet order, the first entity identifier is transmitted as part of the Billing Address field in one of may possible forms. For example, it may be entered as "P.O. Box <first-entity-identifier".

In an especially preferred embodiment, the SCN is not used in an account number to replace the conventional credit card number, but is instead used in conjunction with it—the conventional credit card number itself functions as the first entity identifier, and the SCN is used as a dynamic digital signature to positively identify the first entity and is transferred to the money source in a non-account field of data. In this case, the SCN is transmitted either in the Discretionary Data Field of Track 1 and/or Track 2 or via the Billing Address in a card-not-present transaction.

The Money Source validates the SCN by using the first entity identifier to lookup the information necessary to reproduce the PIN Block encryption for the first entity: the TDES keys, the LCG Seeds, and the PIN. The Money source determines the Counter value by examining the Counter Block, reproduces the calculation of the PIN Block, and then compares the results to the received PIN Block to perform the actual validation.

The Money Source also validates the usage of the SCN based on the embedded TIB. It therefore enforces the various policies based on the first entity's previous transaction history: single-use, multiple-use for single merchant, card-present only.

In the embodiment when the SCN is used in an account number in place of the conventional credit card number, it passes through the standard credit card transaction life-cycle: initial authorization, potential incremental authorization, potential authorization reversal, settlement, and potential credit/return. However, in an especially preferred embodiment, the SCN is only used for initial authorization—beyond that, the Money Source performs its standard transaction processing.

The Money Source may detect fraudulent transaction attempts in various ways. In both the embodiment where the SCN replaces the conventional credit card number, the Money Source may check for re-use of single-use SCNs, use of SCNs without first entity identifiers when the card is not present, re-use of multiple-use/single-merchant SCNs at a different merchant, or SCNs with invalid PIN Blocks. Each of these cases represents a different type of fraud. The Money Source may take various actions in response to each of these types of attacks, such as disabling the account after an excessive number of fraudulent transaction attempts, or returning the code indicating that the merchant should retain the credit card being used for the transaction.

In the preferred embodiment, the Money Source detects fraudulent authorization attempts such as re-use of single-use SCNs, re-use of multiple-use/single-merchant SCNs at a different merchant, SCNs with invalid PIN Blocks, or use of the conventional credit card number on an SCN-enabled account without inclusion of an SCN when the card is not-present. This last case covers simple Internet fraud attempts, but allows, for example, a manual-entry transaction at a POS machine or an imprint transaction. After detecting fraud attempts, the Money Source may take the same types of actions as described above.

It should be noted that the preferred embodiment allows the SCN, when paired with a conventional credit card number, to be validated by back-end software that is integrated with the issuing money source's authorization and settlement processing. An issuing money source can identify an SCN-enabled credit card account in an issuer-determined fashion (e.g., a unique Bank Identification Number). It then forwards select transaction information to the SCN-enabling software, which is installed behind the issuing money source's firewall, which validate, the SCN. This means that software generating the SCN can be allowed operate in isolation—it does not have to be in communication with the back-end software—and thus it can be embedded in a credit card or other standalone device.

The inventions described above can be implemented by a money source for use with an electronic card. It is preferable that every user account utilizes the same Pseudo Random Number Generator (PRNG), such as the PRNG described in P. L'Ecuyer, "Efficient and Portable Combined Random Number Generators", *Communications of the ACM,* 31(6): 742-749,774, 1988, the disclosure of which is specifically incorporated herein by reference. However, each cardholder account has a different initial seed, and thus uses a different part of the PRNG sequence. Since the PRNG has an overall period of $10^{12}$, there is ample room for each account to have its own non-repeating subsequence of 10,000 values.

The PRNG is divided into two parts: seed generation (Formula 2) and value calculation (Formula 3). In these formulas (expressed using C code fragments), the set $(S_x^0, S_x^1, S_x^2)$ is a triplet of five-digit values in the range ([1,32362], [1,31726], [1,31656]), and represents the seed in the $x^{th}$ location in the sequence. Z is interim storage for the pseudo random number, and PRNG[x] indicates the pseudo random number in the $x^{th}$ location in the sequence. Note that for the practical usage of this algorithm, "x" corresponds to the current Counter value. For each transaction, Formula 2 generates the seed (based on the previous seed) and Formula 3 generates the PRNG value.

Formula 2: PRNG Value Calculation $$Z = S_x^0 - S_x^1;$$

$$\text{if } (Z > 706) Z = Z - 32362;$$

$$Z = Z + S_x^2;$$

$$\text{if } (Z < 1) Z = Z + 32362;$$

$$PRNG[x] = Z$$

Formula 3: PRNG Seed Generation $$S_x^0 = (S_{x-1}^0 * 157) \mod 32363$$

$$S_x^1 = (S_{x-1}^1 * 146) \mod 31727$$

$$S_x^2 = (S_{x-1}^2 * 142) \mod 31657$$

In all cases, the initial PRNG seed (which generates value 0 in the PRNG sequence) is pre-assigned to the card. Additionally, the most recently used seed is stored in Random Access Memory (RAM). Thus, when an SCN must be generated, the card runs through both Formulas 2 and 3 exactly once, and then updates the seed storage in RAM. The Counter value is also stored in RAM, and is initialized to the value of 1 at the time the card is manufactured. Multiple values of the Counter are stored to detect accidental corruption. Each time an SCN is generated, the current value of the Counter is used. The Counter is then incremented by 1, and stored again for the next use.

Since the SCN is calculated in an algorithmic fashion, it is possible to pre-calculate the values for a given first entity, and store them on an electronic card. This embodiment is most useful where it is more advantageous to store a large amount of data on the electronic card than it is to perform the algorithms discussed above.

Use of the SCN technology described herein is secure when it requires the cardholder to enter a PIN in order to generate a unique SCN that is valid for only one transaction, and for only the specified cardholder. At no time during the transaction is the PIN at risk. By utilizing both encryption and random number generation technologies described herein, it is possible to achieve at least a 99.9% level of protection against fraud.

Although the foregoing detailed description is illustrative of preferred embodiments of the present invention, it is to be understood that additional embodiments thereof will be obvious to those skilled in the art. For example, the same inventive concepts disclosed herein could be used in a system in which a customer has two or more account numbers and/or identities, with the same or different user keys. In the case of an electronic card or telephone, this would allow the customer to select which account should be used (for example, to choose a business credit card for use with a business expense, a personal credit card for use with a personal expense, or a bank card at a local store for groceries and cash back). Alternatively, a customer might be permitted to use multiple user keys for the same account number and the same identity. This could allow some of the same functionality, or it could be used to classify the type or nature of the expense or transaction. Furthermore, the same SCN concept can be easily extended to non-financial transactions where user authentication is required, such as with electronic Identification cards. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for providing one or more secure transactions between a first entity and at least one additional entity, comprising the steps of:
   (1) generating a Secure Card Number ("SCN") for the first entity, the first entity having a first entity identifier, wherein the SCN includes:
      (a) a Transaction Information Block ("TIB");
      (b) a Counter Block; and
      (c) a Personal Identification Number ("PIN") Block;
   (2) transferring the SCN and the first entity identifier to a second entity in a first transaction;
   (3) causing the SCN and the first entity identifier to be transferred from the second entity to a money source; and
   (4) causing verification that the first transaction is valid with the money source by use of the first entity identifier and the SCN.

2. A method as recited in claim 1, wherein the second entity uses the SCN to authenticate the first entity.

* * * * *